United States Patent
Suh et al.

(10) Patent No.: US 11,272,427 B2
(45) Date of Patent: Mar. 8, 2022

(54) SYSTEMS AND METHODS FOR CAPABILITY INDICATION FOR A WIRELESS RECEIVING STATION

(71) Applicant: Huawei Technologies Co., Ltd., Shenzhen (CN)

(72) Inventors: Jung Hoon Suh, Ottawa (CA); Osama Aboul-Magd, Ottawa (CA); Yan Xin, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/855,738

(22) Filed: Apr. 22, 2020

(65) Prior Publication Data

US 2020/0359299 A1 Nov. 12, 2020

Related U.S. Application Data

(60) Provisional application No. 62/846,203, filed on May 10, 2019.

(51) Int. Cl.
*H04W 4/00* (2018.01)
*H04W 48/08* (2009.01)
(Continued)

(52) U.S. Cl.
CPC .......... *H04W 48/08* (2013.01); *H04B 7/0413* (2013.01); *H04W 48/16* (2013.01); *H04W 84/12* (2013.01)

(58) Field of Classification Search
CPC ..... H04W 48/08; H04W 48/16; H04W 84/12; H04W 84/18; H04W 8/26; H04W 80/04; H04W 88/06; H04B 7/0413
(Continued)

(56) References Cited

U.S. PATENT DOCUMENTS

2016/0127076 A1  5/2016  Sohn et al.
2018/0324801 A1* 11/2018  Sampathkumar ........ H04B 1/38
(Continued)

FOREIGN PATENT DOCUMENTS

| CN | 102696182 A | 9/2012 |
| CN | 104253673 A | 12/2014 |
| EP | 3267642 A1 | 1/2018 |

OTHER PUBLICATIONS

IEEE Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications, IEEE Std 802.11-2016 (Revision of IEEE Std 802.11-2012), pp. 2368-2372 and 2551, Dec. 14, 2016.

*Primary Examiner* — Temica M Beamer
(74) *Attorney, Agent, or Firm* — Slater Matsil, LLP

(57) ABSTRACT

Disclosed herein are systems and methods of communication between an access point (AP) and a plurality of stations (STAs) operating in a wireless local area network (WLAN). The method includes: transmitting, by the AP, a signal for a receiving STA in the plurality of STAs to initiate a channel sounding process for a communication channel between the AP and the receiving STA; receiving, by the AP, a feedback signal from the receiving STA, the feedback signal carrying a frame including a capability indicator for indicating a capability of the receiving STA; and processing, by the AP, the frame carried by the feedback signal to determine at least one of the following: a Modulation and Coding Set (MCS) processable by the receiving STA, a MIMO detection algorithm processable by the receiving STA, and a maximum computational complexity of the receiving STA.

21 Claims, 6 Drawing Sheets

(51) Int. Cl.
*H04B 7/0413* (2017.01)
*H04W 48/16* (2009.01)
*H04W 84/12* (2009.01)

(58) Field of Classification Search
USPC .......................................... 455/422.1; 370/338
See application file for complete search history.

(56) References Cited

U.S. PATENT DOCUMENTS

2020/0112350 A1* 4/2020 Yang ...................... H04B 7/088
2020/0267741 A1* 8/2020 Kwon .................. H04L 25/0204
2021/0028834 A1* 1/2021 Qian .................... H04B 7/0626

* cited by examiner

SYSTEMS AND METHODS FOR CAPABILITY INDICATION FOR A WIRELESS RECEIVING STATION

CROSS-REFERENCE

The present application claims the priority to and the benefit of U.S. provisional application No. 62/846,203 filed on May 10, 2019, the content of which is herein incorporated by reference in its entirety.

FIELD

The present application relates to wireless communication systems having a plurality of wireless transmitting communication devices that collaborate to transmit information to one or more wireless receiving communication devices.

BACKGROUND

The IEEE 802.11 wireless local area networking (WLAN) standard defines one of the most widely deployed wireless technologies in the world. The popularity of wireless networking is driven by the ubiquity of portable mobile handheld devices, and the convenience of untethered communications. With the increasing deployment of multimedia content on the Internet—such as digital video, voice over IP (VoIP), videoconferencing, and real-time applications such as multi-player networked games—along with the deployment of time-sensitive critical applications, there is a strong motivation to support multiple devices, minimize interference between the devices, and improve quality of service to meet more stringent performance requirements.

Wireless local area network (WLAN) communication systems include wireless communication devices that transmit and receive signals, including access points (APs), that function as an interface between the WLAN and one or more further networks, and stations (STA) that exchange signals with the APs.

In some cases, a plurality of APs may work in collaboration to communicate with one or more STAs in a WLAN. For example, the proposed IEEE 802.11be standard is being developed to support a next generation of Extremely High Throughput (EHT) WLAN. EHT communication may be achieved with AP collaboration, which can utilize coordination between multiple APs to minimize interference and improve quality of service for communications with STAs.

In some cases, in a multi-user (MU) scenario, where multiple STAs are receiving signal streams from one or more access points (APs), a STA may not be able to support certain multi-input multi-output (MIMO) detection algorithms.

Improvements are desired to facilitate the coordination of multiple APs in a collaboration mode to communicate with one or more STAs.

SUMMARY

Example embodiments of the present disclosure provide a method and apparatus for communication between an access point (or a wireless transmitting station) and multiple wireless receiving stations or devices.

According to one example aspect, there is a method of communication between an access point (AP) and a plurality of receiving stations (STAs) operating in a wireless local area network (WLAN). The method includes the steps of: transmitting, by the AP, a signal for a receiving STA in the plurality of receiving STAs to initiate a channel sounding process for a communication channel between the AP and the receiving STA; receiving, by the AP, a feedback signal from the receiving STA, the feedback signal carrying a frame including a capability indicator for indicating a capability of the receiving STA; and processing, by the AP, the frame carried by the feedback signal to determine at least one of the following: a Modulation and Coding Set (MCS) processable by the receiving STA, a multi-input multi-output (MIMO) detection algorithm processable by the receiving STA, and a maximum computational complexity of the receiving STA. The method advantageously makes use of a frame in a feedback signal from a receiving station to indicate a capability of the receiving station, and in turn allows the AP to determine if any particular receiving station is capable of processing an advanced MIMO detection algorithm in order to detect and process the transmitted spatial streams properly.

In some embodiments, the method may include generating, by the AP, a response to the receiving STA based on the capability indicator.

In some embodiments, the frame includes: a compressed beamforming action (CBA) frame, a probe request, or an association request.

In some embodiments, the capability indicator includes an index value for the MCS.

In some embodiments, the capability indicator includes one or more of: a modulation type, and a coding rate.

In some embodiments, the MIMO detection algorithm includes one of: MMSE detection algorithm, MLD detection algorithm, and sphere decoding (SD) algorithm.

According to another aspect, there is a wireless transmitting station (also known as an access point) configured to communicate with a plurality of stations (STAs) operating in a wireless local area network (WLAN), the wireless transmitting station includes a processor coupled to a network interface and a computer readable storage medium, the storage medium storing instructions executable by the processor to: transmit a signal for a receiving STA in a plurality of receiving STAs to initiate a channel sounding process for a communication channel between the wireless transmitting station and the receiving STA; receive a feedback signal from the receiving STA, the feedback signal carrying a frame including a capability indicator for indicating a capability of the receiving STA; and process the frame carried by the feedback signal to determine at least one of the following: a Modulation and Coding Set (MCS) processable by the receiving STA, a multi-input multi-output (MIMO) detection algorithm processable by the receiving STA, and a maximum computational complexity of the receiving STA.

In some embodiments, the storage medium store instructions executable by the processor to: generate a response to the receiving STA based on the capability indicator.

In some embodiments, the frame includes: a compressed beamforming action (CBA) frame, a probe request, or an association request.

In some embodiments, the capability indicator includes an index value for the MCS.

In some embodiments, the capability indicator includes one or more of: a modulation type, and a coding rate.

In some embodiments, the MIMO detection algorithm includes one of: MMSE detection algorithm, MLD detection algorithm, and sphere decoding (SD) algorithm.

According to yet another aspect, there is a wireless electronic device configured to communicate with a wireless transmitting station and operating in a wireless local area network (WLAN), the wireless electronic device includes a processor coupled to a network interface and a computer readable storage medium, the storage medium storing instructions executable by the processor to: receive a signal, from the wireless transmitting station, to initiate a channel sounding process for a communication channel between the wireless transmitting station and the wireless electronic device among a plurality of wireless electronic devices; and transmit a feedback signal to the wireless transmitting station, the feedback signal carrying a frame including a capability indicator for indicating a capability of the wireless electronic device, where the frame carried by the feedback signal enables the wireless transmitting station to determine at least one of the following: a Modulation and Coding Set (MCS) processable by the wireless electronic device, a multi-input multi-output (MIMO) detection algorithm processable by the wireless electronic device, and a maximum computational complexity of the wireless electronic device.

In some embodiments, the storage medium store instructions executable by the processor to: receive a response from the wireless transmitting station, where the response is generated based on the capability indicator.

In some embodiments, the frame includes: a compressed beamforming action (CBA) frame, a probe request, or an association request.

In some embodiments, the capability indicator includes an index value for the MCS.

In some embodiments, the capability indicator includes one or more of: a modulation type, and a coding rate.

In some embodiments, the MIMO detection algorithm includes one of: MMSE detection algorithm, MLD detection algorithm, and sphere decoding (SD) algorithm.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION OF EXAMPLE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
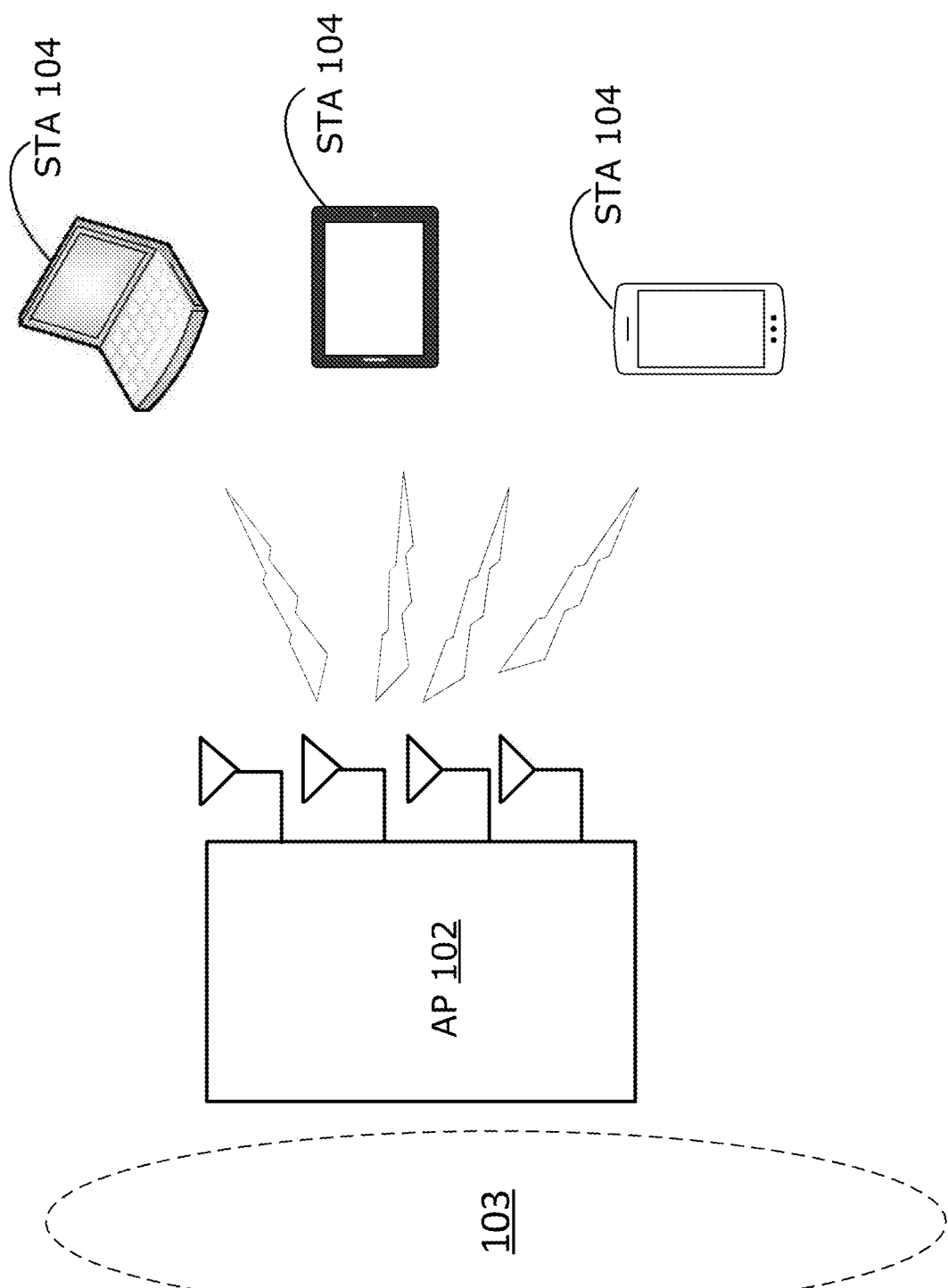
FIG. 1 is a block diagram illustrating communications between an access points (AP) and multiple stations (STAs)

FIG. 1 shows a wireless local area network (WLAN) that includes a plurality of wireless communication devices configured to transmit and receive wireless signals according to example embodiments. The wireless communication devices include at least one access point (AP) 102 and stations (STAs) 104. An AP 102 may also be referred to as a wireless transmitting station or device. In example embodiments, AP 102 is configured to function as an interface between one or more STAs 104 and one or more further networks 103. Each STA 104 is associated through a registration procedure with AP 102. In some embodiments, AP 102 may coordinate with other APs (not shown) to operate collaboratively as a group in an AP collaboration mode. AP 102 collects channel state information (CSI) for all the STAs 104 that are associated with AP 102.

There has been interest in including support in the IEEE 802.11 family of standards to enable Extremely High Throughput (EHT) wireless communications (studied by a Task Group referred to as TGbe). For example, EHT operations beyond 160 MHz bandwidth, such as operations in bandwidths in the range of 180 MHz to 320 MHz (e.g., 180 MHz, 200 MHz, 220 MHz, 240 MHz, 260 MHz, 280 MHz, 300 MHz, or 320 MHz bandwidths) may be considered.

In one or more example embodiments described herein, frame formats specified in the IEEE 802.11ax and IEEE 802.11ac standards (that respectively support High Efficiency (HE) WLAN communications and Very High Throughput (VHT) WLAN communications) are modified to support 16 Spatial Streams for one or more APs in EHT WLAN communications. For example, one or more of the probe request frame, association request frame, and Compressed Beamforming Report Action frame formats specified in the IEEE 802.11ax standard can be modified to facilitate coordination of APs 102 and STAs 104 in an AP collaboration mode that supports EHT WLAN communications.

As shown in FIG. 1, AP 102 may communicate with multiple STAs 104 in a WLAN. In some embodiments, AP 102 and STAs 104 may communicate through multi-user (MU) multi-input and multi-output (MIMO) technology, whereby one AP 102 can communicate with multiple STAs 104 simultaneously in a 5 GHz Wi-Fi frequency band (or possibly a higher Wi-Fi frequency band such as 6 GHz), which greatly improves the network speed and help alleviates congestion on a busy network. MU-MIMO technology is also sometimes referred to as Next-Gen AC, the AC part referring to the IEEE 802.11ac (VHT) standard. IEEE 802.11ax (HE) and IEEE 802.11be (EHT, currently being proposed) standards are also compatible with MU-MIMO. Under the proposed EHT standards, up to total 16 spatial streams (e.g. with one AP having sixteen antennas or four APs, each having four antennas) can be transmitted from an AP 102 to STAs 104 in an MU-MIMO network.

Because AP 102 may have multiple antennas, a STA 104 may receive, simultaneously or near simultaneously, multiple signal streams from AP 102. In order to adapt data transmissions to current channel conditions, it is necessary for AP 102 to know various channel properties of a communication link between AP 102 and a particular STA 104. The channel properties of the communication link may be referred to as channel state information (CSI). The CSI describes how a signal propagates from the transmitter (which may be either AP 102 or STA 104) to the receiver (which may be either STA 104 or AP 102) and represents the combined effect of, for example, scattering, fading, and power decay with distance. The CSI information may include a feedback matrix that is included in a compressed beamforming report (CBR) sent by a STA 104 to AP 102. In some embodiments, the feedback matrix may be calculated by STA 104 based at least in part on information sent to STA 104 by AP 102. The process to learn and estimate such channel properties is known as a channel sounding process or simply a sounding process.

Figure 2:
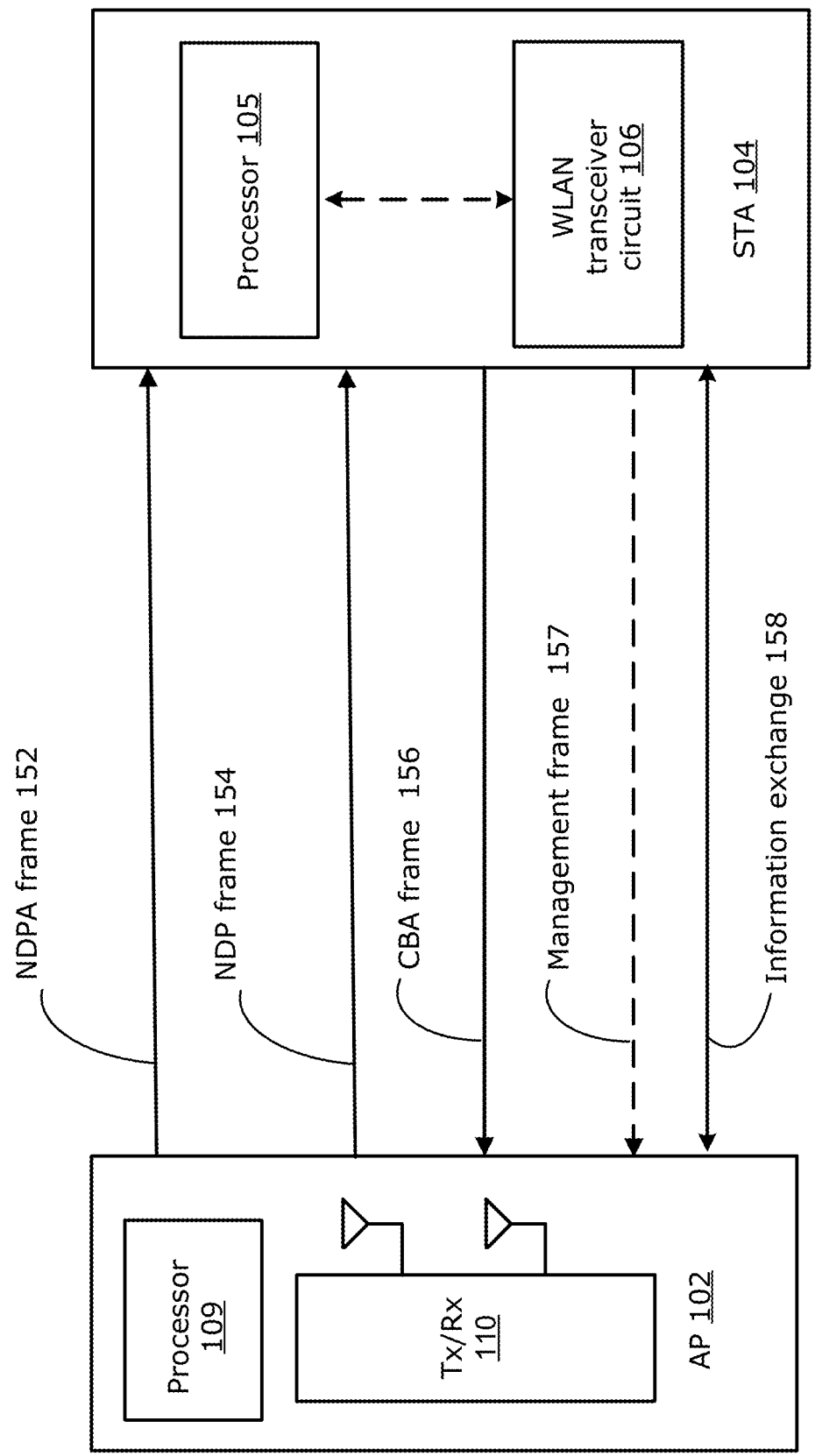
FIG. 2 is a block diagram illustrating communications including a sounding process between an AP and a STA.

FIG. 2 illustrates an example schematic diagram showing an AP 102 in communication with a STA 104. An example AP 102 includes at least a processor 109 and a wireless local area network (WLAN) transceiver circuit 110. An example STA 104 includes at least a processor 105 and a WLAN transceiver circuit 106 (e.g., a Wi-Fi transceiver) for exchanging signals through a wireless interface with the WLAN transceiver circuit 110 of AP 102.

FIG. 2 also illustrates a set of example signals that may be communicated for performing a channel sounding process between AP 102 and STA 104. An AP 102 intending to communicate with a STA 104 initiates a channel sounding process by sending a null data packet announcement (NDPA) frame 152 to STA 104, as described below.

The primary purpose of the NDPA frame 152 is to carry a STA info field for each target STA 104. If an AP 102 intends to communicate with multiple target STAs 104, AP 102 can broadcast the same NDPA frame 152 to all the STAs 104 in the WLAN. The broadcast NDPA frame 152 includes some fields common and applicable to all the target STAs 104, and a separate STA information field for each of the target STAs 104. AP 102 may send a NDPA frame 152 to all target STAs 104. A STA 104 in the network may receive a NDPA frame 152 but determine that it is not an intended target STA based on the information in the NDPA frame 152. The STAs 104 not identified by a NDPA frame 152 sent by AP 102 may simply defer channel access for the AP until the sounding process is completed.

Following the NDPA frame 152 and a short interframe space (SIFS) period, AP 102 transmits a further signal, which carries a null data packet (NDP) frame 154, to each of the target STAs 104. The NDP frame 154 generally has no data field, and includes training fields that contain symbols which will be used by the target STA(s) 104 to generate a compressed beamforming action (CBA) frame 156 that includes a compressed beamforming report (CBR). If a STA 104 is designated as a target STA 104 by AP 102, then the CBA frame 156 may include a CBR for the AP 102 and the CBR includes a feedback matrix. The feedback matrix is calculated by STA 104 based on information received in the NDPA frame 152 and NDP frame 154, and may take the form of a sequence of angles in a compressed form. Once STA 104 has generated the CBA frame 156, it transmits the CBA frame 156 back to AP 102. Appropriate information exchange 158 between the AP 102 and the STA 104 may then take place.

As noted above, following the NDPA frame 152, one or more NDP frames 154 are transmitted from AP 102 to one or more target STAs 104. Each STA 104 can analyze the training fields (e.g. Long Training Fields) included in its respective NDP frame 154 to calculate a specific channel response. The STA 104 can then use the specific channel response information to determine CSI to include in a CBR for the NDP frame 154. The CBR is then included in a CBA frame 156 and transmitted by the STA 104 to provide CSI feedback (FB) to AP 102. For example, the CBR included in CBA frame 156 can be extracted and used by the AP 102 to calculate a BF steering matrix to direct transmission towards the specific STA 104 during the data transmission 158.

In some embodiments, after gathering all the CBA frames 156, each collaborating AP 102 can transmit a beamformed data frame (not shown in FIG. 2) with multiple data streams to the target STAs 104. If the STAs 104 correctly decode the data, the STAs 104 send back an acknowledgement (ACK) (not shown in FIG. 2) frame to the AP 102, after which the AP 102 may begin information exchange 158.

As described earlier, under the proposed EHT standards, up to total 16 spatial streams can be transmitted from an AP 102 to STAs 104 in an MU-MIMO network.

For example, in a MU-MIMO network, multiple signal streams, carrying multiple spatial streams based on spatial multiplexing, from a single AP 102 may superimpose, and the signals from the different antennas interfere with each other. This requires the STAs 104 that have received the multiple spatial streams to perform MIMO detection, which is the process to detect and separate multiple spatial streams from one another where interference may be high. The complexity of the MIMO detection process increases when the number of transmitting antennas, and thus the number of simultaneous spatial streams, increases. In the case of a sufficiently large number of transmitted spatial streams (e.g. 16 spatial streams), the MIMO detection problem becomes very complex and requires each STA 104 in the network to process an advanced MIMO detection algorithm in order to detect and process the transmitted spatial streams properly.

Therefore, when a STA 104 in the network cannot perform a MIMO detection with an advanced MIMO detection algorithm, STA 104 would not be able to properly process the transmitted spatial streams, and thus the available resources offered by the up to 16 spatial streams cannot be fully utilized in a MU-MIMO network. This MIMO detection problem is illustrated in the example experiment below, where it is shown that simple MIMO detection algorithm does not perform as well as the advanced MIMO detection algorithm in a scenario where a sufficiently large number of spatial streams are transmitted in a MU-MIMO setting.

In one example, denote the estimated channel parameters at each receiving antenna (RX) of each STA 104 as $H_{est}$. Each STA 104 may have N_RX number of RXs. The total aggregated size of the MU-MIMO scheduled streams is N_STS_Total, which is equivalent to the sum of all N_RX across all STAs 104 in the MU-MIMO network. Then, a simple detection algorithm that each STA 104 can perform is the minimum mean square error (MMSE) detection algorithm, which is given by the formula $$H_{est}^H(H_{est}H_{est}^H+\sigma^2 I)^{-1}$$

where $\sigma^2$ is the noise variance measured at each RX and I is the identity matrix.

MMSE can be taken for all the transmitted spatial streams including unwanted streams in a MU-MIMO network.

A different and more advanced detection algorithm, the Maximum Likelihood Detection (MLD) algorithm, can be used to perform MIMO detection. MLD algorithm generally cannot be applied over the entire transmitted spatial streams because its computational complexity renders the application impractical. When the MLD algorithm is applied to only the spatial streams intended for each STA 104 ("the targeted streams of a STA 104"), the results of the detection algorithm may be affected by severe interferences from the adjacent streams intended for other scheduled STAs 104. The MLD detection algorithm regards all the interferences as white noises. However, the interferences from other spatial streams are typically not white. Thus, an interference whitening process is required in order to use the MLD algorithm effectively.

Denote the channel parameter matrix for the targeted streams of a STA 104 as $H_w$, which can be calculated as $H_{est}$ (for all targeted columns). For example, for a STA 104 with 2 RXs and receiving 2 targeted streams (along with unwanted spatial streams), $H_w$ for STA 104 is a 2×2 matrix.

Denote the channel parameter matrix for the unwanted streams of a STA 104 as $H_u$, that is, $H_{est}$ (for all unwanted columns). For example, for a STA 104 with 2 RXs and receiving 16 total spatial streams, 2 out of the 16 spatial streams are targeted streams for STA 104, therefore $H_u$ for STA 104 is a 2×14 matrix. Then, matrix C can be computed as:

$$C=H_u H_u^H+\sigma^2 I$$

where $\sigma^2$ is the noise variance measured at each RX and I is the identity matrix.

A matrix B can be computed based on C as follows:

$$B=C^{-1/2}.$$

Matrix B can be obtained by executing the function sqrtm(pinv(C)) in MATLAB.

A received signal y (size, N_RX×1) is then multiplied by matrix B to obtain an updated signal, which can be denoted as $y_{new}$. The effective channel parameters, denoted as $H_{new}$, are obtained by multiplying $H_{est}$ with matrix B. $y_{new}$ and $H_{new}$ are then passed to the 2-stream only MLD.

Simulations were run for the two MIMO detection algorithms (namely, the MLD detection and the MMSE detection), based on 16 transmitting spatial streams scheduled in a MU-MIMO network, with a total of eight STAs 104, 2 RXs (and thus 2 targeted streams) per STA 104. The simulated performances are illustrated in FIG. 5 (MLD detection) and FIG. 6 (MMSE detection) The simulation parameters include, for example: 16 long training field (LTF) symbol based Channel Estimation for 16 total spatial streams, perfect sounding (no CSI Quantization error, no CSI feedback error, but real channel estimation using the 4×LTF based NDP), zero-forcing beamforming in the TX, and MMSE detection (FIG. 6) vs. Interference Whitening based MLD (FIG. 5) in each STA, Binary Convolutional Code (BCC) for forward error correction (FEC), MCS 1, 3, 5 and 7, packet size for PER: 400 bytes for MCS 1, 3, 5, and 500 bytes for MCS 7; and a P-matrix for 16 Stream Channel Estimation in case of 16 LTF symbol based case:

$$P_{16\times 16} = \begin{bmatrix} P_{8\times 8} & P_{8\times 8} \\ P_{8\times 8} & -P_{8\times 8} \end{bmatrix}.$$

A P-matrix is a LTF mapping matrix with which LTFs are mapped to multiple streams in orthogonal manners. Rows of the P-matrix are mapped to the transmitted multiple streams and columns of the P-matrix are mapped to the LTF symbols. The 8×8 P-matrix is defined in the IEEE 802.11 standards (*IEEE Standard for Information technology—Telecommunications and information exchange between systems Local and metropolitan area networks—Specific requirements—Part* 11: *Wireless LAN Medium Access Control (MAC) and Physical Layer (PHY) Specifications,*" in IEEE Std 802.11-2016 (*Revision of IEEE Std* 802.11-2012), pp. 2368-2372 and 2551, 14 Dec. 2016). In some embodiments, a 16×16 P-matrix, as shown above, can be used to map 16 streams and 16 LTFs. The 16×16 P-matrix is the consolidation of four 8×8 P-matrix.

Figure 5:
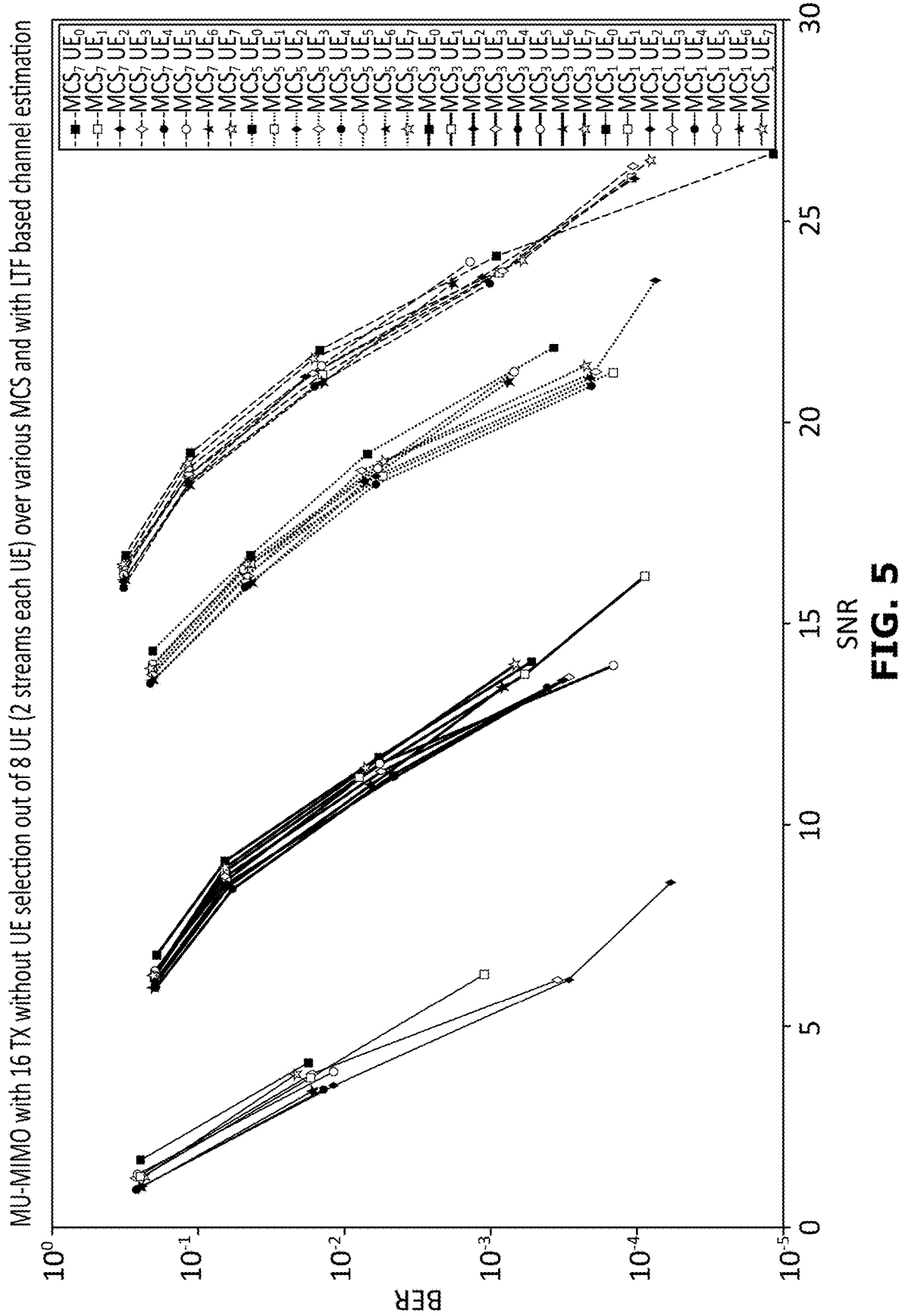
FIG. 5 illustrates a Channel Estimation based on 16 LTF symbols for 16 total streams (8 STA MU-MIMO) with Interference Whitening based MLD.
Figure 6:
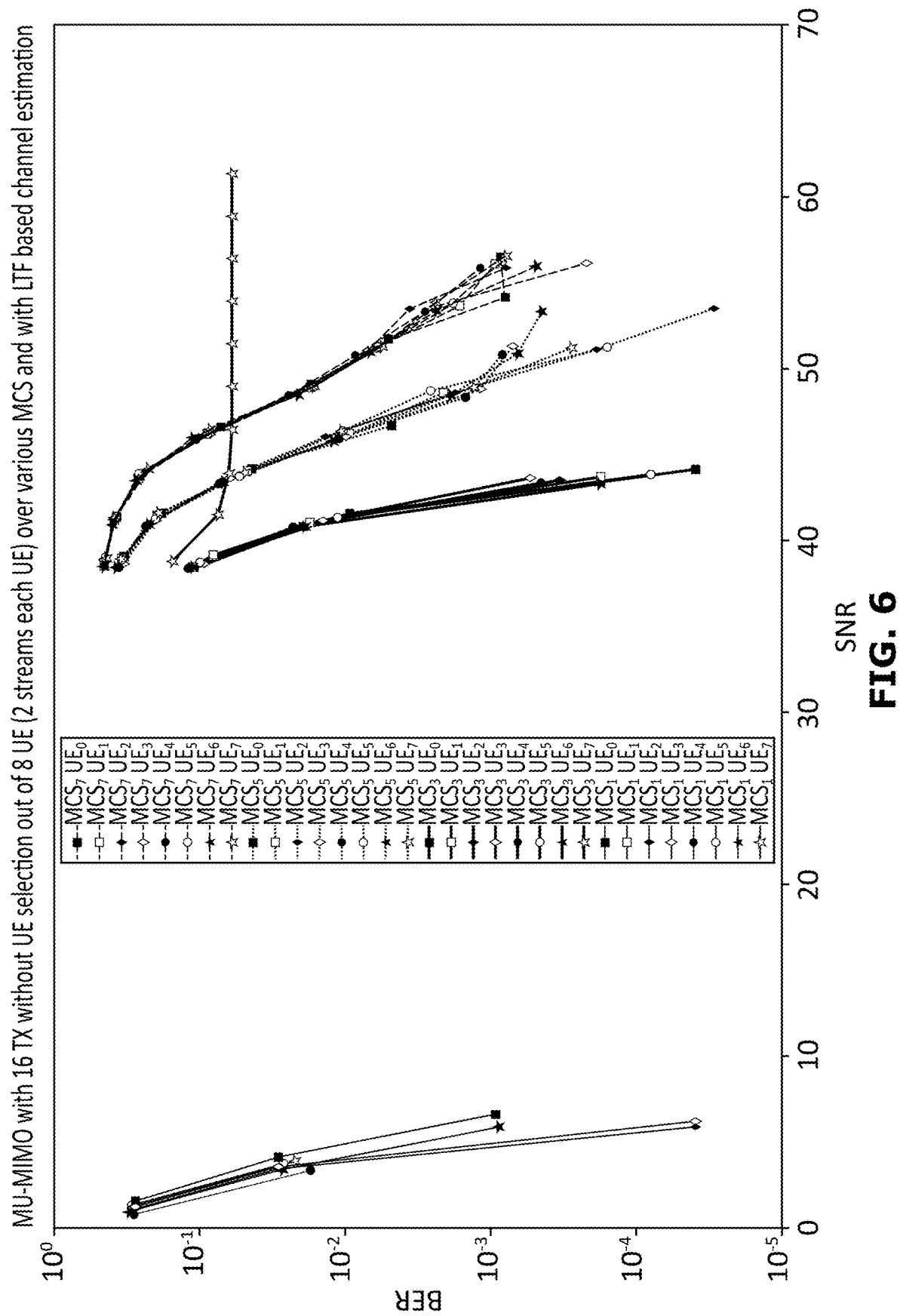
FIG. 6 illustrates a Channel Estimation based on 16 LTF symbols for 16 total streams (8 STA MU-MIMO) with MMSE MIMO Detection.

As seen in FIG. 5 (MLD detection) and FIG. 6 (MMSE detection), certain MIMO detection algorithms such as MMSE detection do not perform well enough to support all the MCS when the 16 spatial streams are fully utilized for an MU-MIMO scheduling. The performance of MMSE detection in FIG. 6 degrades severely for MCS 3, 5 and 7, whereas the Interference Whitening based MLD in FIG. 5 performs well over the MCS 1, 3, 5 and 7.

In other words, although a MMSE detection algorithm, which is a relatively simple detection algorithm, can be implemented by all STAs 104 for MIMO detection process, it may not perform well when a sufficiently large number of spatial streams (e.g. 16 streams) are simultaneously scheduled and transmitted in a MU-MIMO setting. In such scenario, a more advance MIMO detection algorithm, such as the MLD detection algorithm, may be required to properly detect and process all spatial streams by a STA 104. However, not all STAs 104 are equipped to implement an advanced MIMO detection algorithm, therefore, a solution may be to include a capability indicator in a management frame, generated and sent by each STA of all STAs 104, to AP 102. The management frame thus can indicate the STA's capability when it comes to supporting high MCSs and implementing certain detection algorithms.

In some embodiments, a CBA frame 156 may be used to indicate a capability of a STA 104 in a MU-MIMO scenario. For example, a reserved field in a MIMO control field in CBA frame 156 may be used to indicate a capability of STA 104, further described below.

As mentioned earlier, in alternative embodiments, STA 104 can send a separate feedback signal carrying a management frame 157 to AP 102 for indicating a capability of STA 104.

Therefore, in an example embodiment, AP 102 can send a signal for a STA 104 in the plurality of STAs 104 to initiate a channel sounding process for a communication channel between AP 102 and STA 104. AP 102 then receives a feedback signal from STA 104, the feedback signal carrying a frame, which includes a capability indicator for indicating a capability of STA 104. The frame may be a CBA frame 156 or a different frame, such as a management frame 157. For example, the feedback signal may carry a probe request frame or an association request frame 157 from STA 104 to AP 102 during an association process. The probe request frame or the association request frame 157 can include a capability indicator for indicating a capability of STA 104.

Figure 3:
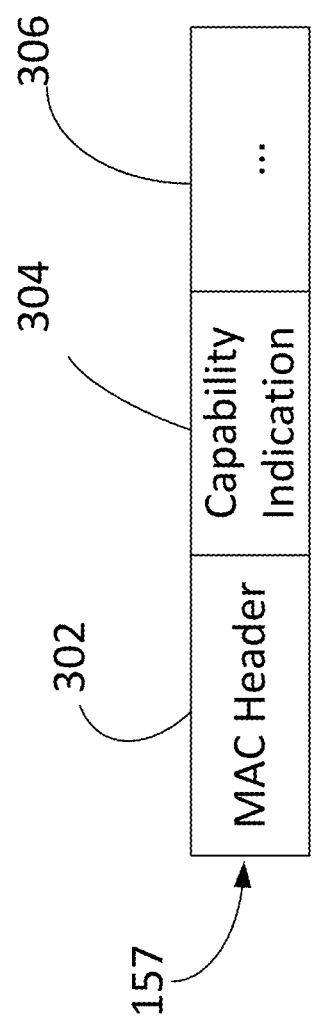
FIG. 3 illustrates an example management frame format according to an example embodiment.

The management frame 157 may be transmitted by STA 104 before the CBA frame 156. FIG. 3 shows an example embodiment of management frame in the form of an association request frame 157, which includes a plurality of fields 302, 304, 306. Fields 302 include fields in a MAC header, including frame control, duration, BSSID, and so on. Capability indication field 304, which may be part of the frame body, may be used to indicate the capability of STA 104, such as the capability to process one or more Modulation and Coding Set (MCS) or one or more MIMO detection algorithms. Capability indication field 304 may indicate a maximum computational complexity of the STA 104, which means a maximum computational complexity that can be handled by STA 104. Field(s) 306 may include one or more fields in a frame body, such as for example session ID.

Alternatively or concurrently, the capability indication field 304 may be used to indicate the capability of STA 104 to implement or use one or more MIMO detection algorithms, such as one or more of: MMSE detection algorithm, MLD detection algorithm, sphere decoding (SD) algorithm, and so on. In other embodiments, capability indication field 304 may be used to indicate a level of computational complexity that can be handled by STA 104.

In some example embodiments, once AP 102 has received the frame including a capability indicator such as a capability indication field 304, the AP processes the capability indication field 304 in the frame to determine at least one of the following: a Modulation and Coding Set (MCS) processable by STA 104, a MIMO detection algorithm processable by STA 104, and a maximum computational complexity that can be handled by the receiving STA 104. The AP, based on the capabilities of STA 104, may then generate a response to STA 104 accordingly. For example, if the frame sent by STA 104 is an association request frame 157, AP 102 may receive and analyze frame 157 to determine that STA 104 can process a MCS of 256 QAM or a MLD detection algorithm. In this case, AP 102 may determine that the capability of STA 104 meets a minimum requirement for effective communication between AP 102 and a STA, and further generate an association response to STA 104 to facilitate an association process with STA 104. The association response includes, for example, an association ID for STA 104.

If AP 102 determines, based on the capability of STA 104, that STA 104 fails to meet the minimum requirement for effective communication, it may generate and transmit a response back to STA 104 refusing the association request.

The minimum requirement may be pre-determined by AP 102 or manually by a network administrator.

In some example embodiments, the capability indication for a MCS includes an index value for the MCS. For example, in 802.11n networks, the MCS index goes from 0 to 31, while in 802.11ac networks, the MCS index goes from 0 to 9 for each number of spatial streams.

In some example embodiments, the capability indication for a MCS may include a modulation type, a coding rate, or both. For example, a modulation type can be frequency-division multiplexing (FDM), orthogonal frequency-division multiplexing (OFDM), binary phase shift keying (BPSK), quadrature phase shift keying (QPSK), quadrature amplitude modulation (QAM) or direct-sequence spread spectrum (DSSS), to name a few. A coding rate (or code rate), often expressed as information bits per coded bit, can provide an indication of how much of a data stream is being used to transmit usable information. A modulation type may be associated with a corresponding coding rate, which may range from 1/2 to 5/6 depending on the specific modulation scheme.

Even though example embodiments herein describe single-AP scenario in a MU-MIMO environment, a person reasonably skilled in the art may appreciate that the capability indicator may also be implemented for multi-AP scenario, where multiple APs may collaborate and transmit multiple spatial streams to multiple STAs.

Figure 4:
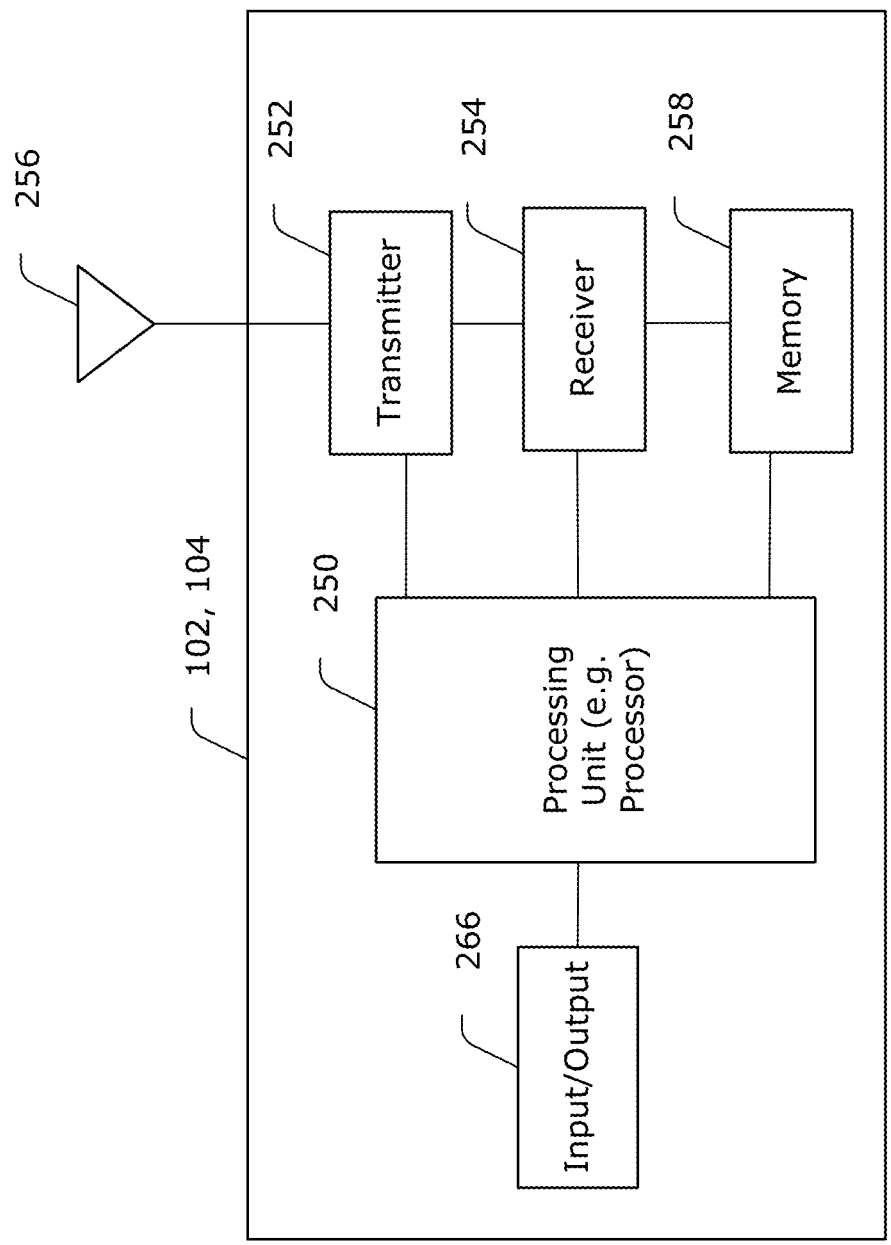
FIG. 4 is a block diagram illustrating an example electronic device that may act as an AP or receiving STA.

FIG. 4 shows an example transceiving apparatus that may act as an AP 102 or a STA 104, includes at least one processing unit 250, at least one transmitter 252, at least one receiver 254, one or more antennas 256, at least one memory 258, and one or more input/output devices or interfaces 266. The processing unit 250 (which may include processor 105 in the case of STA 104, or processor 109 in the case of AP 102) implements various processing operations of AP 102 or the receiving STA 104, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 can, for example, include a microprocessor, microcontroller, digital signal processor, field programmable gate array, or application specific integrated circuit.

The transmitter 252 and receiver 254 may collectively be used to implement WLAN transceiver circuit 106 in the case of STA 104 or WLAN transceiver circuit 110 in the case of AP 102. Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. The memory 258 stores instructions and data used, generated, or collected by AP 102 or STA 104. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

The above-described embodiments of the present disclosure, taken either individually or in combination, provide the technical benefits of facilitating greater and more efficient network throughput and capacity, by allowing a wireless transmitting station (or AP) to determine if any particular receiving station is capable of processing an advanced MIMO detection algorithm in order to detect and process the transmitted spatial streams properly, and supporting a coordination of multiple APs in a collaboration mode to communicate with one or more STAs.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method of communication between an access point (AP) and a plurality of receiving stations (STAs) operating in a wireless local area network (WLAN), the method comprising:

transmitting, by the AP, a signal for a receiving STA in the plurality of receiving STAs to initiate a channel sounding process for a communication channel between the AP and the receiving STA;

receiving, by the AP from the receiving STA, a feedback signal, the feedback signal from the receiving STA carrying a frame including a capability indicator indicating a capability of the receiving STA; and processing, by the AP, the capability indicator in the frame carried by the feedback signal to determine at least one of the following: a Modulation and Coding Set (MCS) processable by the receiving STA, a multi-input multi-output (MIMO) detection algorithm processable by the receiving STA, or a maximum computational complexity of the receiving STA.

2. The method of claim 1, further comprising: generating, by the AP, a response to the receiving STA based on the capability indicator.

3. The method of claim 1, wherein the frame carried by the feedback signal from the receiving STA further comprises a compressed beamforming action (CBA) frame.

4. The method of claim 1, wherein the frame carried by the feedback signal from the receiving STA further comprises a probe request.

5. The method of claim 1, wherein the frame carried by the feedback signal from the receiving STA further comprises an association request.

6. The method of claim 1, wherein the capability indicator in the frame carried by the feedback signal from the receiving STA comprises an index value for the MCS.

7. The method of claim 1, wherein the capability indicator in the frame carried by the feedback signal from the receiving STA comprises one or more of: a modulation type, or a coding rate.

8. The method of claim 1, wherein the MIMO detection algorithm comprises one of: MMSE detection algorithm, MLD detection algorithm, and sphere decoding (SD) algorithm.

9. A wireless transmitting station configured to communicate with a plurality of stations (STAs) operating in a wireless local area network (WLAN), comprising:

at least one processor coupled to a network interface; and a non-transitory computer readable storage medium, the non-transitory computer readable storage medium storing instructions executable by the at least one processor that cause the wireless transmitting station to:

transmit a signal for a receiving STA in a plurality of receiving STAs to initiate a channel sounding process for a communication channel between the wireless transmitting station and the receiving STA;

receive, from the receiving STA, a feedback signal, the feedback signal from the receiving STA carrying a frame including a capability indicator indicating a capability of the receiving STA; and process the capability indicator in the frame carried by the feedback signal to determine at least one of the following: a Modulation and Coding Set (MCS) processable by the receiving STA, a multi-input multi-output (MIMO) detection algorithm processable by the receiving STA, or a maximum computational complexity of the receiving STA.

10. The wireless transmitting station of claim 9, wherein the non-transitory computer readable storage medium stores instructions executable by the at least one processor that cause the wireless transmitting station to: generate a response to the receiving STA based on the capability indicator.

11. The wireless transmitting station of claim 9, wherein the frame carried by the feedback signal from the receiving STA further comprises: a compressed beamforming action (CBA) frame, a probe request, or an association request.

12. The wireless transmitting station of claim 9, wherein the capability indicator in the frame carried by the feedback signal from the receiving STA comprises an index value for the MCS.

13. The wireless transmitting station of claim 9, wherein the capability indicator in the frame carried by the feedback signal from the receiving STA comprises one or more of: a modulation type, or a coding rate.

14. The wireless transmitting station of claim 9, wherein the MIMO detection algorithm comprises one of: MMSE detection algorithm, MLD detection algorithm, and sphere decoding (SD) algorithm.

15. A wireless electronic device configured to communicate with a wireless transmitting station and operating in a wireless local area network (WLAN), comprising:
- at least one processor coupled to a network interface; and
- a non-transitory computer readable storage medium, the non-transitory computer readable storage medium storing instructions executable by the at least one processor that cause the wireless electronic device to:
  - receive, from the wireless transmitting station, a signal to initiate a channel sounding process for a communication channel between the wireless transmitting station and the wireless electronic device among a plurality of wireless electronic devices; and
  - transmit a feedback signal to the wireless transmitting station, the feedback signal transmitted by the wireless electronic device carrying a frame including a capability indicator indicating a capability of the wireless electronic device,
- wherein the capability indicator in the frame carried by the feedback signal enables the wireless transmitting station to determine at least one of the following: a Modulation and Coding Set (MCS) processable by the wireless electronic device, a multi-input multi-output (MIMO) detection algorithm processable by the wireless electronic device, or a maximum computational complexity of the wireless electronic device.

16. The wireless electronic device of claim 15, wherein the non-transitory computer readable storage medium stores instructions executable by the at least one processor that cause the wireless electronic device to: receive a response from the wireless transmitting station, wherein the response is generated based on the capability indicator.

17. The wireless electronic device of claim 15, wherein the frame carried by the feedback signal from the wireless electronic device further comprises: a compressed beamforming action (CBA) frame, a probe request, or an association request.

18. The wireless electronic device of claim 15, wherein the capability indicator in the frame carried by the feedback signal from the wireless electronic device comprises an index value for the MCS.

19. The wireless electronic device of claim 15, wherein the capability indicator in the frame carried by the feedback signal from the wireless electronic device comprises one or more of: a modulation type, or a coding rate.

20. The wireless electronic device of claim 15, wherein the MIMO detection algorithm comprises one of: MMSE detection algorithm, MLD detection algorithm, and sphere decoding (SD) algorithm.

21. The method of claim 1, wherein the capability indicator in the frame carried by the feedback signal from the receiving STA indicates at least one of: a capability of the receiving STA to process one or more MCSs, a capability of the receiving STA to use one or more MIMO detection algorithms, or the maximum computational complexity of the receiving STA.

* * * * *